United States Patent
Wallis

[15] 3,636,320
[45] Jan. 18, 1972

[54] NONREVERSIBLE ODOMETER

[72] Inventor: George C. Wallis, Livonia, Mich.

[73] Assignee: Ford Motor Company, Dearborn, Mich.

[22] Filed: July 23, 1970

[21] Appl. No.: 64,049

[52] U.S. Cl..................................................235/95, 235/96
[51] Int. Cl.........................................................G01c 22/00
[58] Field of Search........................235/95, 96, 97, 117, 132

[56] References Cited

UNITED STATES PATENTS

| | | | |
|---|---|---|---|
| 1,690,356 | 11/1928 | Zubaty | 235/96 X |
| 2,143,550 | 1/1939 | Gilbert | 200/52 |
| 2,148,768 | 2/1939 | Miller | 235/91 |
| 2,342,325 | 2/1944 | Bliss | 235/144 |
| 2,957,625 | 10/1960 | Burke et al. | 235/114 |
| 3,231,191 | 1/1966 | Berck | 235/132 |
| 3,404,834 | 10/1968 | Emery et al. | 235/132 |
| 3,453,420 | 7/1969 | Freese et al. | 235/132 |
| 3,458,127 | 7/1969 | Hermann | 235/95 |

Primary Examiner—Stephen J. Tomsky
Attorney—John R. Faulkner and William E. Johnson

[57] ABSTRACT

A nonreversible odometer for a driven vehicle includes a plurality of driven number wheels which display the total distance traveled by the vehicle. The gear train of the odometer is designed so that an input thereto which increases the total indicated travel of the vehicle is transmitted through the gear train to increase the travel distance displayed on the number wheels. On the other hand, if the input to the odometer is one which would decrease the total displayed travel of the vehicle, the drive between the input shaft and the number wheels is interrupted and no decrease is effected.

2 Claims, 6 Drawing Figures

PATENTED JAN 18 1972
3,636,320
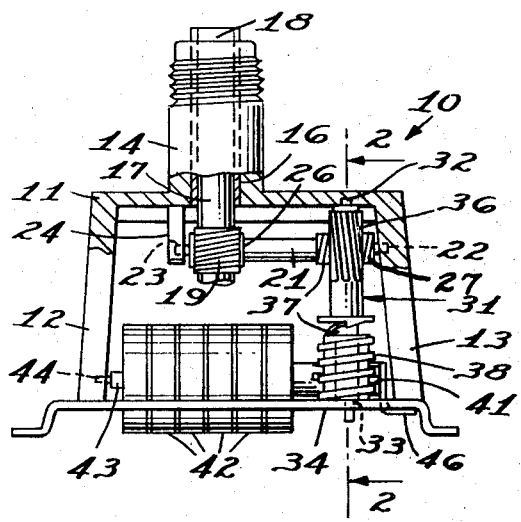
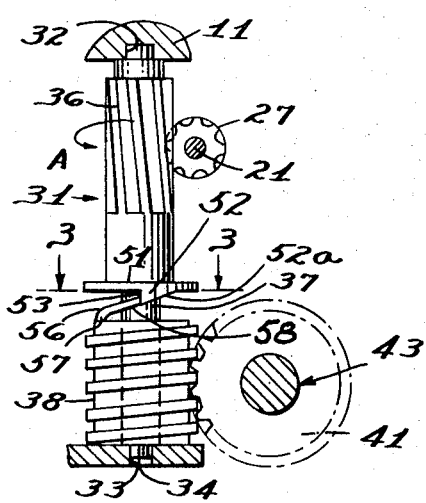
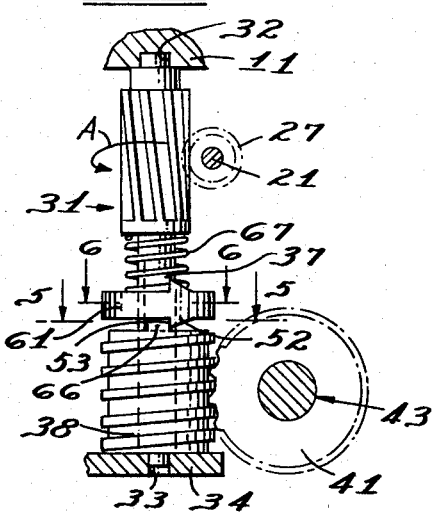
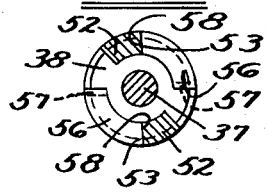
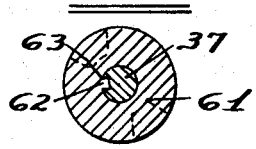
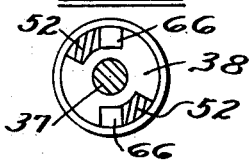
INVENTOR
GEORGE C. WALLIS
BY John R. Faulkner
William E. Johnson
ATTORNEYS

NONREVERSIBLE ODOMETER

BACKGROUND OF THE INVENTION

Most driven vehicles are equipped with an odometer which records the total distance traveled by the vehicle. This indication of the total travel of the vehicle is important to a used vehicle purchaser. The total distance already traveled by the vehicle generally indicates the total distance left for normal usable operation of the vehicle. This is particularly true with respect to both certain engine components and certain components which must be repaired or replaced at approximately fixed increments of vehicle travel.

To mislead the purchaser of a used motor vehicle, the vehicle's odometer is sometimes reset to reduce the total indicated vehicle travel recorded thereon. More particularly, if the normal rotational input to the odometer is reversed, a reduction is effected in the total travel distance indicated thereon. When the reverse input to the odometer is at a high rotational rate, it is easy to run off a substantial amount of indicated vehicle travel within a short period of time.

SUMMARY OF THE INVENTION

This invention relates to a nonreversible odometer and, more particularly, to a nonreversible odometer in which the driving interconnection between and input member and a display device of the odometer is interrupted if the input member is driven in such a direction as would result in a reduction in the total indicated distance on the display device.

In accordance with the teachings of this invention, a nonreversible odometer for use in a vehicle to indicate the total distance traveled by the vehicle is constructed in the following manner. An input member of the odometer is driven by apparatus responsive to movement of the vehicle. A display device is provided for indicating the distance traveled by the vehicle. A drive element for driving the display device is connected with the input member so that a displacement is occasioned in the display device in response to the movement of the vehicle. Elements are provided in the interconnection of the display device and the input member to interrupt the connection when the input member is driven in a direction which would result in a reduction in the total displayed travel distance. On the other hand, when the input member is driven in a direction to increase the total displayed distance, the interconnection of the input member and the drive element of the display device is made by the elements so that the total displayed travel distance is increased.

In greater detail, the drive element of the display device is interconnected with the input member by a drive train. The drive train has elements associated therewith which permit the drive train to drive the display device only when the input member is driven in a direction which increases the displayed distance thereon. When the input member is driven to decrease the total displayed travel distance, the interconnection of the input member and the drive element is interrupted and no decrease occurs in the indicated travel distance of the odometer.

BRIEF DESCRIPTION OF THE DRAWINGS

FIG. 1 is a plan view of a nonreversible odometer formed in accordance with the teachings of this invention.

FIG. 2 is a view taken along the line 2—2 of FIG. 1 showing in greater detail a first embodiment of the nonreversible odometer.

FIG. 3 is a partial, cross section view taken along line 3—3 of FIG. 2 showing details of the structure of the first embodiment.

FIG. 4 is a view similar to FIG. 2 showing a second embodiment of the nonreversible odometer.

FIG. 5 is a view taken along line 5—5 of FIG. 4 showing the structure of the second embodiment in greater detail.

FIG. 6 is a cross section view taken along line 6—6 of FIG. 4 showing more details of the structure of the second embodiment.

DESCRIPTION OF THE PREFERRED EMBODIMENT

General Construction

In FIG. 1 a nonreversible odometer is shown and generally identified by the numeral 10. The odometer has a frame 11 which has sidewalls 12 and 13 as well as a tubular housing 14 extending therefrom. The tubular housing 14 has an internal bearing 16 which supports for rotative movement therewithin an input shaft 17. One end 18 of the shaft is coupled to and driven by an odometer input device which is driven in a known manner by some portion of a motor vehicle. A gear 19 is formed on the portion of the input shaft which extends into the space between the side walls of the odometer frame.

A cross-shaft 21 is supported at its right end as viewed in FIG. 1 in a bearing surface 22 formed in the sidewall 13 of the frame 11. The other end of the cross-shaft is supported in a bearing surface 23 formed in a projecting portion 24 of the frame 11. The cross-shaft has a gear 26 formed thereon which is in meshing engagement with the gear 19 of the input shaft 17. The cross-shaft also has a second gear 27 thereon at its end adjacent the sidewall 13.

A primary shaft, generally designated by the numeral 31, is supported for rotative movement at one end in a bearing surface 32 formed in the back portion of the frame 11 and at the other end in a bearing surface 33 formed in a housing member 34. The housing member is attached to and supported at opposite ends by the sidewalls 12 and 13 of the frame 11.

As best seen in FIG. 2, the primary shaft 31 of a first embodiment of the odometer structure of this invention has a gear 36 thereon in meshing engagement with the gear 27 of the cross-shaft 21. The primary shaft also has a front portion 37 of a reduced diameter upon which a drive gear 38 is rotatably mounted. In turn, the drive gear 38 is in engagement with a gear 41 which is drivingly associated with a plurality of odometer number wheels 42. The number wheels are mounted on a shaft 43 supported at one end in a bearing surface 44 formed in the sidewall 12 and at the other end in a bearing surface formed in a member 46, which member is, in turn, secured to and supported by the sidewall 13. The exact method and manner in which the gear 41 displaces the number wheels 42 so as to indicate the total travel of the vehicle may take any one of the many forms known in the prior art. Typical odometer drive structures are shown in U.S. Pat. Nos. 3,116,875; 3,137,444; 3,250,468 and 3,333,768.

Now with particular reference to FIG. 2, the first embodiment of the interruptable drive connection formed between the primary shaft 31 and the drive gear 38 supported thereon will be described in detail. In the central portion of the primary shaft a flange 51 is formed. This flange supports a pair of cam members 52 thereon each defining a cam surface 52a. Each cam member 52 terminates at a dropoff 53. The drive gear 38 has one or more projecting, deflectable tabs 56 thereon, one of which is seen in FIG. 2. These tabs 56 are attached at one end 57 to the gear 38. The attachment of the tab and gear may be accomplished by molding the gear and tab in a single plastic molding operation. The free end 58 of each tab 56 engages one of the dropoffs 53 and forms a driving connection therewith when the primary shaft 31 is rotated in the direction of arrow A of FIG. 2.

OPERATION

Operation of the first embodiment structure for the nonreversible odometer of this invention is as follows. An input to the input shaft 17 caused by forward travel of the motor vehicle is in such a direction that the rotation of the primary shaft 31 is in the direction of arrow A of FIG. 2. With such rotational direction established in the primary shaft 31, the dropoff 53 of each cam member 52 forms a driving connection with the free end 58 of an associated tab 56 of the drive gear 38. The drive gear, in turn, displaces the odometer gear drive 41 whereby incremental displacements are occasioned in the odometer number wheels 42 thereby to increase the total indicated distance of travel of the vehicle.

When a reverse input is supplied to the input shaft 17 in an attempt to reduce the total indicated distance on the odometer number wheels 42, the rotational movement delivered to the primary shaft 31 by the cross-shaft 21 is in a direction opposite to the direction indicated by arrow A of FIG. 2. With such a rotational movement delivered to the primary shaft 31, the shaft is rotated in such a direction that the cam surface 52a of each of the cam members 52 is moved to engage initially the attached end 57 of an associated deflectable tab 56 and thereafter to move over the upper surface of the tab past the free end thereof. In such a manner, the free end 58 of the each tab 56 is moved up the cam surface 52a and then over the dropoff 53 repeatedly during the reverse rotation of the primary shaft 31. When such a continued deflection of the projecting tabs occurs, no driving relationship is established between the primary shaft and the drive gear 38. When no driving relationship is established between these two elements, the odometer gear drive 41 is not actuated and no displacement is occasioned in the odometer number wheels 42.

Thus, the first embodiment structure for the nonreversible odometer of this invention has been described. This odometer permits the recordation of actual distance covered when the vehicle is traveling in a normal direction. Any attempts to reverse the input to the odometer and thereby to reduce the total indicated display of the odometer is stymied by interruption of the drive connection between the input shaft and the gear drive associated with the odometer wheels.

SECOND EMBODIMENT

Having described the preferred embodiment, a second embodiment for the structure of the nonreversible odometer of this invention is shown in FIGS. 4, 5 and 6. In these figures like parts will be designated by the same reference numerals as utilized in the description of the first embodiment structure.

In the second embodiment structure, the primary shaft 31 has a reduced portion 37 of increased length. A ring-shaped element 61 encircles the shaft's reduced portion and is keyed thereto by a projecting internal portion 62 which is received within a recess 63 formed along the length of the reduced portion of the shaft (best seen in FIG. 6). The ring 62 carries the cam members 52 thereon.

The drive gear 38 has associated therewith a pair of drive lugs 66, only one of which is seen in FIG. 4. A spring 67 also encircles the reduced portion 37 of the shaft 31 and acts between the back of the ring element 61 and a larger portion of the shaft 31 to bias the ring element in such a direction that the dropoff 53 of each of the cam members 52 is in engagement with its associated drive lug 66 of the drive gear 38.

When the shaft 31 is rotated in the direction of arrow A, the dropoff 53 of each of the cam members 52 forms a driving relationship with the drive lugs 66 on drive gear 38 whereby the number wheels are displaced in a proper direction to record the total travel of the vehicle. On the other hand, when the primary shaft 31 is rotated in a direction opposite to the direction of arrow A of FIG. 4, the drive lugs are contacted by the cam surfaces 52a of the cam members 52 and the ring element 61 is displaced upwardly as view in FIG. 4 against the bias of the spring. In such a manner, when the primary shaft 31 is rotated in the wrong direction, the drive relationship between the shaft 31 and the drive gear 38 is interrupted and a decrease does not occur on the odometer wheels in the total indicated travel of the vehicle.

There has been described herein a nonreversible odometer structure wherein the nonreversing feature is obtained by interrupting the drive connection between the input member to the odometer and the display device of the odometer. The nonreversible odometer in accordance with this invention is relatively inexpensive to construct and extremely reliable in operation.

What is claimed is:

1. A nonreversible odometer for use in a vehicle to indicate the total distance traveled by the vehicle, which odometer comprises:
 a frame;
 an input shaft rotatably mounted in said frame, said shaft being driven by apparatus responsive to movement of the vehicle;
 a plurality of number wheels supported for rotation in said frame for displaying an indication of the distance traveled by the vehicle;
 gear drive means associated with said number wheels for rotatively driving said number wheels to vary the displayed indication of the distance traveled by the vehicle;
 gear train means supported by said frame for interconnecting said input shaft and said gear drive means so that rotation of said input shaft results in displacement of said number wheels, said gear train means including both a primary shaft and a drive gear rotatably mounted on said primary shaft, said drive gear being in driving engagement with said gear drive means associated with said number wheels and said primary shaft being driven when said input shaft is rotated; and
 interruptable drive means interconnecting said primary shaft and said drive gear mounted on said shaft for interrupting the driving connection between said two last mentioned elements when said primary shaft is driven by said input shaft in a direction which would reduce the total displayed travel indicated on said plurality of number wheels.

2. The nonreversible odometer as defined in claim 1 wherein: said interruptable drive means includes a ring encircling and keyed to said primary shaft for axial movement therealong, said ring having a sloping cam surface terminating in a dropoff facing said drive gear; a spring encircling said primary shaft and biasing said ring toward said drive gear; and a lug on said drive gear extending toward said ring, said lug both making driving contact with said dropoff of said ring when said primary shaft is rotated to increase the value of the display of said number wheels, and said lug moving over said cam surface of said ring and off said dropoff of said cam surface during rotation of said primary shaft in a direction opposite said direction causing an increase in the displayed distance of travel of the vehicle whereby said number wheels are not driven through said gear drive means associated therewith.

* * * * *